(12) United States Patent
Jeon et al.

(10) Patent No.: US 8,966,508 B2
(45) Date of Patent: Feb. 24, 2015

(54) METHOD FOR EXECUTING HYBRID WEB APPLICATION AND APPARATUS THEREFOR

(71) Applicant: Electronics & Telecommunications Research Institute, Daejeon (KR)

(72) Inventors: Jong Hong Jeon, Daejeon (KR); Sung Han Kim, Daejeon (KR); Seung Yun Lee, Daejeon (KR); Kang Chan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/770,549

(22) Filed: Feb. 19, 2013

(65) Prior Publication Data

US 2013/0219415 A1 Aug. 22, 2013

(30) Foreign Application Priority Data

Feb. 20, 2012 (KR) .................... 10-2012-0016738
Jan. 31, 2013 (KR) .................... 10-2013-0011044

(51) Int. Cl.
*G06F 3/00* (2006.01)
*G06F 9/54* (2006.01)

(52) U.S. Cl.
CPC ...................................... *G06F 9/541* (2013.01)
USPC ......................................... 719/328; 719/313

(58) Field of Classification Search
None
See application file for complete search history.

(56) References Cited

U.S. PATENT DOCUMENTS

| 2003/0126311 | A1 | 7/2003 | Kushnirskiy et al. |
| 2006/0085421 | A1* | 4/2006 | Backhouse et al. ............. 707/10 |
| 2010/0305722 | A1* | 12/2010 | Jin et al. ........................ 700/90 |
| 2013/0038674 | A1* | 2/2013 | Woods et al. .............. 348/14.08 |
| 2013/0055266 | A1* | 2/2013 | Gittelman et al. ............ 718/100 |
| 2014/0167928 | A1* | 6/2014 | Burd et al. .................. 340/12.5 |

FOREIGN PATENT DOCUMENTS

| KR | 10-2010-0087860 | 8/2010 |
| KR | 10-2011-0071757 | 6/2011 |
| KR | 10-2011-0124406 | 11/2011 |

OTHER PUBLICATIONS

Junho Jin et al., "Mobile App Development based on HyWAI Framework", vol. 38, No. 2(D), 2011, pp. 5-8.
"Hybrid Mobile Application Platform, HyWAI", 2010, pp. 18-24.
"Hybrid Web Platform for Smartphone, HyWAI", 2010, pp. 94-99.

* cited by examiner

*Primary Examiner* — Tuan Dao
(74) *Attorney, Agent, or Firm* — Staas & Halsey LLP

(57) ABSTRACT

The device for executing a hybrid web application written in a web standard language including a system API call includes a web user interface layer that requests a process according to the system API call from a hybrid web application interface layer, and performs a process according to the web standard language, a hybrid web application interface layer that requests the process corresponding to the system API call from a cross platform system service interface layer in response to the request of the web user interface layer, receives a result of the process corresponding to the system API call from the cross platform system service interface layer, and transmits the received result to the web user interface layer, and a cross platform system service interface layer that performs a platform dependent operation corresponding to the system API based on the request of the hybrid web application interface layer.

19 Claims, 5 Drawing Sheets

FIG. 1

|  | NATIVE APPLICATION | WEB APPLICATION | HYBRID WEB APPLICATION |
|---|---|---|---|
| GRAPHIC PERFORMANCE | HIGH | LOW | HIGH |
| APP STORE SALE (MONETIZE) | POSSIBLE | IMPOSSIBLE | POSSIBLE |
| OFFLINE MODE | POSSIBLE | PARTIALLY POSSIBLE | POSSIBLE |
| WEB SERVICE MASHUP | IMPOSSIBLE | POSSIBLE | POSSIBLE |
| MULTI-PLATFORM SUPPORT | DIFFICULT | EASY | MIDDLE |
| STORAGE | LOCAL | CLOUD | ALL |
| USE DEVICE CAPABILITY | EASY | IMPOSSIBLE (IMPROVING) | EASY |
| MULTI-USER COMMON OPERATION | IMPOSSIBLE | POSSIBLE | POSSIBLE |
| SW UPDATING METHOD | RE-INSTALLATION | CORRECTION IN USE | PARTIAL RE-INSTALLATION |
| APPLICATION REUSABILITY | ONLY SOURCE/ LIB UTILIZATION | TO SOURCE AND SAAS | ALL |
| UI PRODUCTION DIFFICULTY | HIGH | LOW | MIDDLE |
| UI EXPRESSION CAPACITY | HIGH | LOW | MIDDLE |

FIG. 2

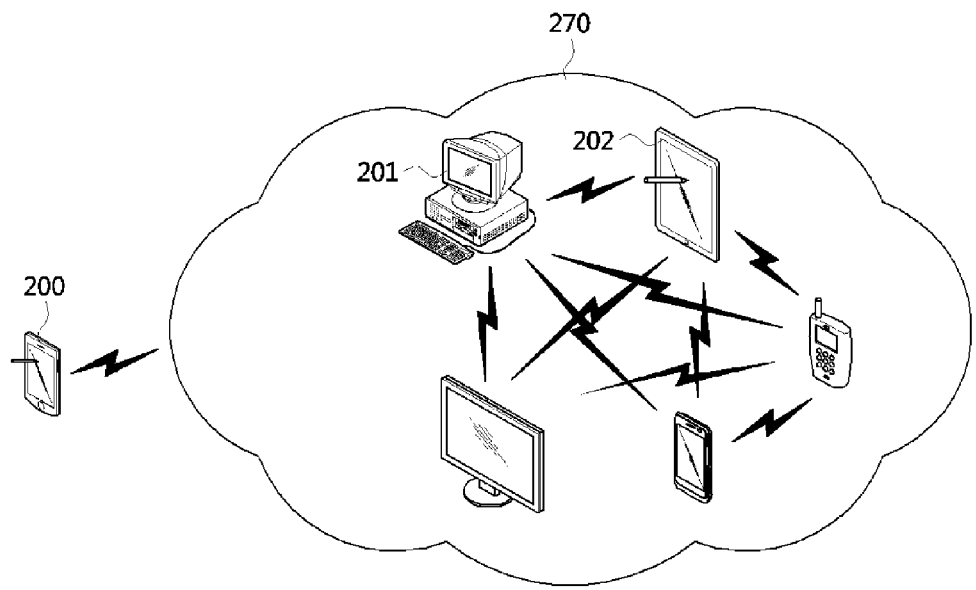

000000US 8,966,508 B2

METHOD FOR EXECUTING HYBRID WEB APPLICATION AND APPARATUS THEREFOR

CLAIM FOR PRIORITY

This application claims priority to Korean Patent Application No. 10-2012-0016738 filed on Feb. 20, 2012 and No. 10-2013-0011044 filed on Jan. 31, 2013 in the Korean Intellectual Property Office (KIPO), the entire contents of which are hereby incorporated by reference.

BACKGROUND

1. Technical Field

Example embodiments of the present invention relate in general to a hybrid web application and more specifically to a structure of a hybrid web application that is operated independently in various kinds of platforms, and a method for executing the hybrid web application and a device for operating the hybrid web application based on the structure.

2. Related Art

A demand for rapidly developing and providing various applications has increased with the spread of smart devices. A typical method of mobile application development is a native application development method. This method of developing an application based on a library provided from a specific platform is suitable for realizing excellent performance such as spectacular effect or fast screen transition due to excellent accessibility with respect to a terminal resource.

However, a platform dependency problem of the application arises due to the advent of various mobile platforms (for example, Apple's iOS, Google's Android, or the like), and as an alternative for this, a web application development method based on a mobile browser is receiving attention.

The web application has various advantages such as that separate installation for use is not required, an upgraded function is always used without periodical updating, and the like, but also has disadvantages such as that a terminal function cannot be directly controlled or utilized due to web-based characteristics, and performance of the application is dependent on characteristics of a browser.

SUMMARY

Accordingly, example embodiments of the present invention are provided to substantially obviate one or more problems due to limitations and disadvantages of the related art.

Example embodiments of the present invention provide a concept of a hybrid web application complexly having advantages of a native application and advantages of a web application, and a software architecture for executing the hybrid web application and a method for executing the hybrid web application having the software architecture.

Example embodiments of the present invention also provide a software architecture for executing a hybrid web application and a method for executing the hybrid web application based on the software architecture.

In some example embodiments, a device for executing a hybrid web application written in a system API call and a web standard language includes: a web user interface layer that requests a process according to the system API call from a hybrid web application interface layer, and performs a process according to the web standard language; a hybrid web application interface layer that requests the process corresponding to the system API call from a cross platform system service interface layer in response to the request of the web user interface layer, synchronously or asynchronously receives a result of the process corresponding to the system API call from the cross platform system service interface layer, and transmits the received result to the web user interface layer; and a cross platform system service interface layer that performs a platform dependent operation corresponding to the system API based on the request of the hybrid web application interface layer.

Here, the system API may be an API that controls hardware or an API that accesses information managed by an operating system (OS).

Here, the web standard language may include at least one of Java Script, HyperText Markup Language (HTML), and Cascading Style Sheet (CSS).

Here, the web user interface layer may include at least one web engine for performing the process according to the web standard language, and a script engine that separates the system API call included in the hybrid web application and requests the process according to the system API call from the hybrid web application interface layer.

Here, the hybrid web application interface layer may include a system API processing unit that processes the system API in response to the request of the web user interface layer, an interface service request generating unit that generates a request for system API execution in response to the system API processing unit, and transmits the generated request to an interface service request relaying unit, the interface service request relaying unit that relays, to the cross platform system service interface layer, the request for system API execution received from the interface service request generating unit, and an interface service synchronization managing unit that manages reception of a processing result of the request for system API execution transmitted to the cross platform system service interface layer through the interface service request relaying unit.

Here, the request for system API execution of the interface service request relaying unit may be synchronous or asynchronous, and the interface service synchronization managing unit may manage the interface service request relaying unit so that the interface service request relaying unit receives the processing result of the request for system API execution in any one of a synchronous method and an asynchronous method.

Here, the cross platform system service interface layer may include a web server that transmits and receives a processing request of the system API and a processing result of the system API using the hybrid web application interface layer and HyperText Transfer Protocol (HTTP).

Here, the web server may transmit and receive the processing request of the system API and processing result of the system API using the hybrid web application interface layer and HTTP which are installed in another terminal.

Here, the cross platform system service interface layer may further include a system interface unit that processes the processing request of the system API transmitted through the web server.

Here, the system interface unit may include a system interface request processing unit that receives the processing request of the system API transmitted through the web server, and a system interface interworking unit that maps the processing request of the system API transmitted from the system interface request processing unit as a platform dependent API, and processes the processing request of the system API by calling to the mapped platform dependent API.

In other example embodiments, a method for executing a hybrid web application of a platform including a web user interface layer, a hybrid web application interface layer, and a cross platform system service interface layer includes: interpreting, by the web user interface layer, the hybrid web application written in a system API call and a web standard language, requesting a process according to the system API call from the hybrid web application interface layer, and performing a process according to the web standard language; requesting, by the hybrid web application interface layer, the process according to the system API call based on the request of the web user interface layer from the cross platform system service interface layer, synchronously or asynchronously receiving a processing result of the system API call from the cross platform system service interface layer, and transmitting the received processing result to the web user interface layer; and performing, by the cross platform system service interface layer, a platform dependent operation corresponding to the system API based on the request of the hybrid web application interface layer.

Here, the system API may be an API that controls hardware or an API that accesses information managed by an OS.

Here, the web standard language may include at least one of Java Script, HTML, and CSS.

Here, the interpreting of the hybrid web application may include performing the process according to the web standard language using at least one web engine and requesting the process according to the system API call from the hybrid web application interface layer.

Here, the requesting of the process according to the system API call may include generating a request for system API execution based on a processing request corresponding to the system API call from the web user interface layer, transmitting the generated request for system API execution to the cross platform system service interface layer, and receiving a processing result of the transmitted request for system API execution from the cross platform system service interface layer.

Here, reception of the processing result of the request for system API execution with respect to the request for system API execution may be performed using a synchronous interface method or an asynchronous interface method.

Here, the cross platform system service interface layer and the hybrid web application interface layer may transmit and receive a processing request of the system API and a processing result of the system API using HTTP.

Here, the hybrid web application interface layer may transmit and receive the processing request of the system API and the processing result of the system API using a cross platform system service interface layer and HTTP of another terminal.

Here, the performing of the platform dependent operation may include mapping the processing request of the system API transmitted from the hybrid web application interface layer as a platform dependent API, and processing the processing request of the system API by calling to the mapped platform dependent API.

BRIEF DESCRIPTION OF DRAWINGS

Example embodiments of the present invention will become more apparent by describing in detail example embodiments of the present invention with reference to the accompanying drawings, in which:

FIG. 1 is a table for comparing advantages and disadvantages of a hybrid web application according to an embodiment of the present invention and a native/web application according to the related art;

FIG. 2 is a conceptual diagram illustrating interworking of platforms for executing a hybrid web application according to an embodiment of the present invention;

DESCRIPTION OF EXAMPLE EMBODIMENTS

Figure 3:
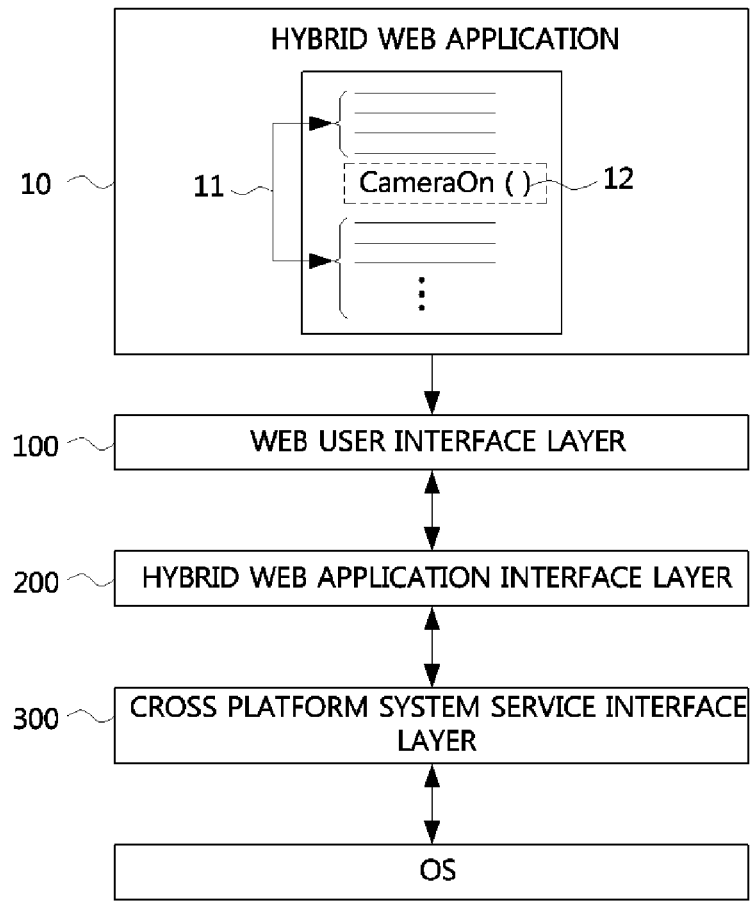
FIG. 3 is a block diagram illustrating a software layer structure of a device for executing a hybrid web application according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings.

The following descriptions relates to an apparatus and method for providing a platform independent hybrid web application in a variety of terminal environments including smart phones, and desktops including mobile device, small-sized devices, and the like.

In the following descriptions, the term "platform" is a concept that encompasses an underlying processor and hardware devices of a system and an operating system (OS) for operating a corresponding system, and the term "terminal device" refers to a device that is actually implemented based on a specific platform. In the following descriptions, the platform and the terminal are interchangeably used, but the terminal is used as a means to emphasize hardware characteristics based on the platform, and the platform is used as more comprehensively.

Concept and Operation of Hybrid Web Application According to the Present Invention The present invention relates to a method and apparatus for providing a hybrid web application independent from characteristics of a variety of kinds of platforms and terminal devices.

It is possible to develop a platform independent application using a hybrid web application method, develop an application having the same function as a native application based on web technologies, and easily develop and use mash-up applications linked to a variety of Internet open APIs.

A hybrid web application that is presented in the present invention may be written in a web standard language including a system application programming interface (API) call. Accordingly, in the hybrid web application, a platform-independent portion may be written in the web standard language in the same manner as a web application in the related art, and a platform-dependent portion may be written so as to call a system API. For example, the web standard language may include HyperText Markup Language (HTML), Cascading Style Sheet (CSS), JavaScript, and the like. The system API is an API that is defined so as to enable control and access with respect to resources of a platform in which a hybrid web application is executed or another platform. Here, the resources of the platform may include hardware control information (for example, a camera, an acceleration sensor, a GPS sensor, and the like), information (for example, contact information, calendar information, and the like when a terminal is a smart phone) that is managed by an OS of a platform, and the like.

FIG. 1 is a table for comparing advantages and disadvantages of a hybrid web application according to an embodiment of the present invention and a native/web application according to the related art.

Referring to FIG. 1, since a native application is developed based on a library provided from a specific platform, the native application is suitable for achieving excellent performance such as spectacular effects or fast screen transition due to excellent access with respect to platform resources. In addition, the native application may be distributed in the form of a binary file, thereby having advantages such as that online or offline sale through app stores is easily performed. However, the native application adopts a platform-dependent development method, whereby there are disadvantages such as that upgrade of software is not easily performed, and reusability of a code is reduced.

On the other hand, the web application has advantages and disadvantages different from the above-described advantages and disadvantages of the native application. That is, the web application has various advantages such as that separate installation for use is not required, an upgraded function is always used without periodical update, and the like, but also has disadvantages such as that a terminal function cannot be directly controlled or utilized due to web-based characteristics, and performance of applications is dependent on characteristics of a web browser.

The hybrid web application is an attempt to employ the advantages of the two application methods. In a hybrid web application method in the synthetic form of the native application and the web application, the hybrid web application may be packaged like the native application, and sold through app stores and the like so as to ensure profitability while being programmed using web standard technologies (HTML, CSS, and JavaScript).

In addition, the hybrid web application according to the present invention may be programmed through the web standard language, thereby reducing time and cost required for the development.

In addition, the hybrid web application according to the present invention may use a system API call for the purpose of platform-dependent hardware control and access to OS management information, thereby having performance similar to the native application.

In particular, the hybrid web application according to the present invention may have a structure that can control hardware and an OS of another platform that is different from a platform that is currently executed.

FIG. 2 is a conceptual diagram illustrating interworking of platforms for executing a hybrid web application according to an embodiment of the present invention.

Referring to FIG. 2, the hybrid web application according to the present invention may access hardware resources and OS resources of mutually different platforms between platforms in which the hybrid web application is executed.

For example, the hybrid web application according to the present invention may be applied to a variety of terminals 200 so as to be driven, and may mutually call a cross platform system service interface layer, which will be described later, provided from various terminals 201 and 202 connected through a wired or wireless network, using HyperText Transfer Protocol (HTTP).

Accordingly, terminals that are devices for executing the hybrid web application according to the present invention may mutually share resources so as to configure a virtual hybrid application cloud 270, and mutually control and utilize unique resources and services of each of the terminals.

Device for Executing Hybrid Web Application

FIG. 3 is a block diagram illustrating a software layer structure of a device for executing a hybrid web application according to an embodiment of the present invention. Referring to FIG. 3, a hybrid web application 10 is executed using a web user interface layer 100, a hybrid web application interface layer 200, and a cross platform system service interface layer 300.

The hybrid web application 10 may be written in a web standard language 11, and may be written to include at least one system API call 12. In this instance, the web standard language for writing the hybrid web application may include JavaScript, HTML, and CSS, and also include other web standard languages corresponding to these and web standard languages which will be newly developed in the future. As described above, the system API may be defined for the hybrid web application according to the present invention so as to enable control and access control with respect to resources (for example, a camera, an acceleration sensor, a GPS sensor, and the like) of a platform in which the hybrid web application is executed or another platform, and enable access to information (for example, contact information, calendar information, and the like when a platform is a smart phone) managed by the platform.

In addition, the above-described web user interface layer 100, the hybrid web application interface layer 200, and the cross platform system service interface layer 300 are named according to their representative functions, and are not limited by these names. The hybrid web application 10 and the layers 100, 200, and 300 may be stored in a memory unit of a terminal, and executed by a processor. In this instance, the respective layers may be discrete modules, which are strictly divided, or may be merged as a single module while maintaining their separate functions.

In terms of distribution of the applications, a type of the above-described hybrid web application 10 may be a binary file. In addition, the hybrid web application 10 may be sold online or offline using app stores in the form of a single application package together with the whole or a part of the web user interface layer 100, the hybrid web application interface layer 200, and the cross platform system service interface layer 300.

In addition, as another distribution method of the applications, the above-described layers 100, 200, and 300 and the hybrid web application 10 may be separated and distributed. That is, when the above-described layers 100, 200, and 300 are installed in the platform in advance, only the hybrid web application may be distributed online or offline. Obviously, the above-described layers 100, 200, and 300 may be distributed online or offline separately from the hybrid application.

Hereinafter, a role and detailed configuration of each of the above-described layers will be described.

1) Web User Interface Layer

The web user interface layer 100 is a layer that interprets the hybrid web application 10, requests a process according to the system API call 12 included in the hybrid web application from the hybrid web application interface layer 200, which will be described later, and directly performs a process corresponding to a general web standard language portion instead of the system API call.

Figure 4:
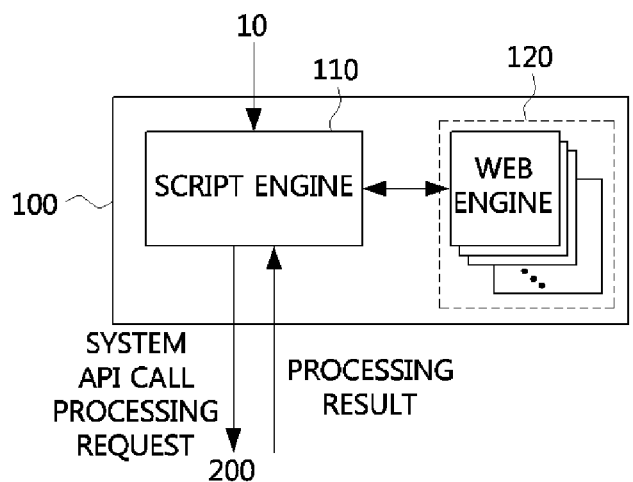
FIG. 4 is a block diagram illustrating a detailed configuration of a web user interface layer for executing a hybrid web application according to an embodiment of the present invention.

FIG. 4 is a block diagram illustrating a detailed configuration of a web user interface layer for executing a hybrid web application according to an embodiment of the present invention.

Referring to FIG. 4, the web user interface layer may include at least one web engine 120 for executing a general web standard language portion, and a script engine 110 for separating the general web standard language portion and the system API call portion from the hybrid web application.

The web engine 120 includes an HTML rendering engine, a CSS rendering engine, or the like, and executes the general web standard languages which are separated and provided by the script engine so as to provide a browsing screen a manner similar to that of the typical web application.

The script engine 110 interprets the hybrid web application so as to provide the general web standard language portion 11 to the web engine, and requests a process according to the system API call from the hybrid web application interface layer 200 in response to the system API calls 12.

In this instance, an embodiment in which the web engine and the script engine are not clearly separated may be used. That is, typically, the web engine may include the script engine (for example, JavaScript Interpreter), and in this case, in the script engine included in the web engine, a function of separating the general web standard language portion and the system API call portion from the hybrid web application should be implemented.

2) Hybrid Web Application Interface Layer

The hybrid web application interface layer 200 requests, from the cross platform system service interface layer 300, the process according to the system API call in response to the request of the web user interface layer 100, synchronously or asynchronously receives a processing result corresponding to the system API call from the cross platform system service interface layer 300, and transmits the received processing result to the web user interface layer.

Figure 5:
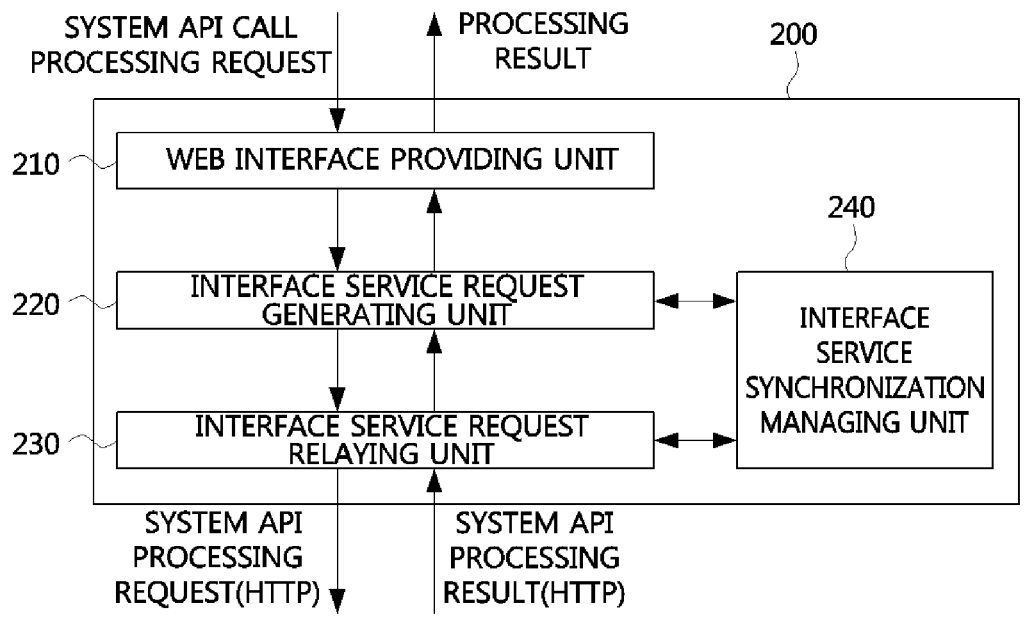
FIG. 5 is a block diagram illustrating a detailed configuration of a hybrid web application interface layer for executing a hybrid web application according to an embodiment of the present invention.

FIG. 5 is a block diagram illustrating a detailed configuration of a hybrid web application interface layer for executing a hybrid web application according to an embodiment of the present invention.

Referring to FIG. 5, the hybrid web application interface layer 200 according to the present invention may include a web interface providing unit 210, an interface service request generating unit 220, an interface service request relaying unit 230, and an interface service synchronization managing unit 240.

First, the web interface providing unit 210 receives a request for a process according to the system API call from the above-described web user interface layer 100, and provides the processing result to the web user interface layer 100.

The interface service request generating unit 220 generates a device control and system function control API request requested by the web interface providing unit 210, in accordance with a request specification defined in advance.

The interface service request relaying unit 230 transmits the request generated through the interface service request generating unit to the cross platform system service interface layer 300 in a synchronous/asynchronous interface processing method.

The interface service synchronization managing unit 240 manages a synchronous/asynchronous interface processing process.

The interface service request relaying unit 230 transmits the request generated through the interface service request generating unit 220 to the cross platform system service interface layer 300, and receives the result from the cross platform system service interface layer 300 in synchronous/asynchronous manner. Here, the interface service synchronization managing unit 240 performs a process related to the reception in the synchronous/asynchronous manner. Meanwhile, an interface processing method of the corresponding system API may be determined depending on characteristics of the system API.

Figure 6:
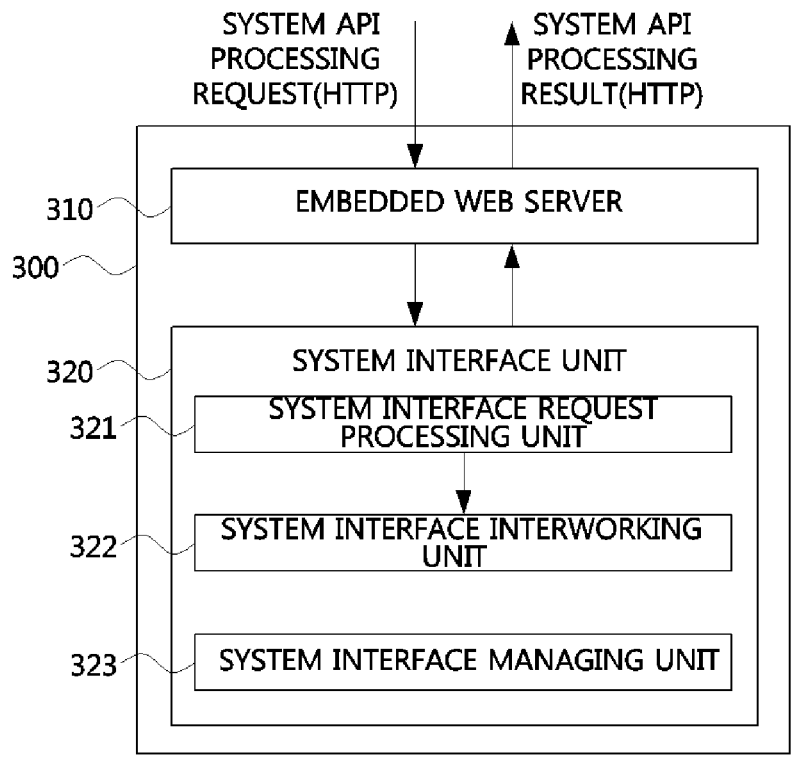
FIG. 6 is a conceptual diagram illustrating a process for transmitting a processing request and receiving a processing result between a hybrid web application interface layer and a cross platform system service interface layer according to an embodiment of the present invention.

FIG. 6 is a conceptual diagram illustrating a process for transmitting a processing request and receiving a processing result between a hybrid web application interface layer and a cross platform system service interface layer according to an embodiment of the present invention.

Referring to FIG. 6, in step S511, the hybrid web application interface layer 200 may request, from the cross platform system service interface layer 300, a synchronous process with respect to a processing request corresponding to a predetermined system API. In this case, in step S512, the interface service request relaying unit 230 may stop execution of the application until the result of the request is received through the interface service synchronization managing unit 240, and then receive the result from the cross platform system service interface layer 300.

Meanwhile, in step S531, the hybrid web application interface layer 200 may request, from the cross platform system service interface layer 300, an asynchronous process with respect to a processing request corresponding to a predetermined system API. In this case, in step S532, the interface service request relaying unit 230 may transmit the processing request to the cross platform system service interface layer 300, and then receive the result from the cross platform system service interface layer 300 when the result of the request is received through the interface service synchronization managing unit 240.

In addition, another interface method may be a notification-type asynchronous process. The notification refers to that a triggering condition registered in advance is satisfied, or the other party is notified of a generated triggering event. The notification has a difference from the above-described typical asynchronous process in that the notification is not one-time processing result reception, and the fact that the condition is satisfied and the event is generated is continuously notified of every time the triggering condition registered by the other party is satisfied or the event is generated.

In step S521, the hybrid web application interface layer 200 may request, from the cross platform system service interface layer 300, registration with respect to notification about a processing request corresponding to a predetermined system API. In this case, the interface service request relaying unit 230 may transmit the processing request to the cross platform system service interface layer 300, and then perform other operations without waiting for the reception of the result.

Next, in step S522, when an event to notify the registered notification is generated, the interface service request relaying unit 230 may receive the notification from the cross platform system service interface layer 300 through the interface service synchronization managing unit 240.

3) Cross Platform System Service Interface Layer

The cross platform system service interface layer 300 is a layer that performs a platform dependent operation corresponding to the system API in response to the request of the hybrid web application interface layer.

Figure 7:
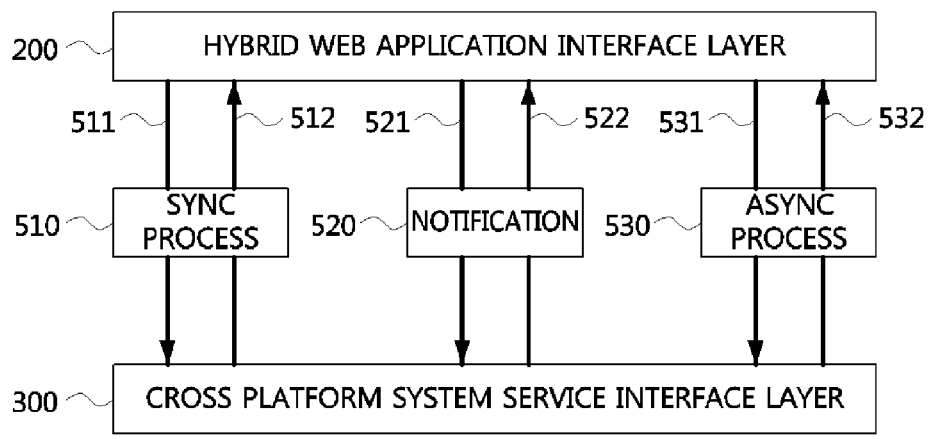
FIG. 7 is a block diagram illustrating a detailed configuration of a cross platform system service interface layer for executing a hybrid web application.

FIG. 7 is a block diagram illustrating a detailed configuration of a cross platform system service interface layer for executing a hybrid web application.

Referring to FIG. 7, the cross platform system service interface layer 300 may include a web server 310 and a system interface unit 320. More specifically, the system interface unit 320 may include a system request processing unit 321 and a system interface interworking unit 322.

First, the web server 310 is a web server embedded within the cross platform system service interface layer 300, and exchanges a processing request and a processing result of a system API using the hybrid web application interface layer and HTTP.

The cross platform system service interface layer 300 and the hybrid web application interface layer 200 may be configured so as to exchange the processing request and the processing result of the system API using HTTP, and therefore the cross platform system service interface layer 300 and the hybrid web application interface layer 200 may be positioned in mutually different terminals.

That is, the cross platform system service interface layer 300 and the hybrid web application interface layer 200 which are positioned in mutually different terminals may exchange the processing request and the processing result of the system API using HTTP.

Accordingly, the hybrid web application may call the cross platform system service interface layer that is provided from various terminals connected through wired and wireless networks, using HTTP.

Figure 8:
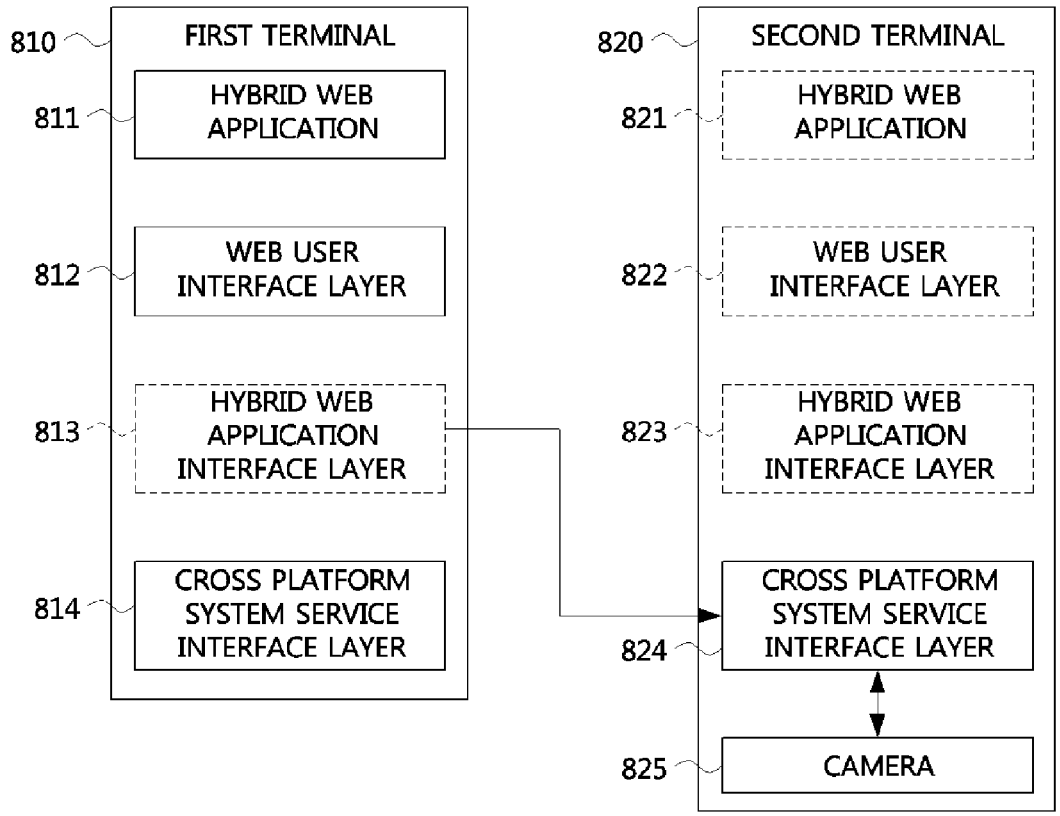
FIG. 8 is a conceptual diagram illustrating interworking between a hybrid web application interface layer and a cross platform system service interface layer which are positioned in mutually different terminals according to an embodiment of the present invention.

FIG. 8 is a conceptual diagram illustrating interworking between a hybrid web application interface layer and a cross platform system service interface layer which are positioned in mutually different terminals according to an embodiment of the present invention.

Referring to FIG. 8, for example, when a hybrid web application 811 mounted in a smart phone 810 (first terminal) of a user controls a camera 825 mounted in a smart phone 820 (second terminal) of another user, a hybrid web application interface layer 813 installed in the first terminal may transmit a processing request of a camera control system API to a cross platform system service interface layer 824 installed in the second terminal using HTTP. This may correspond to the concept described through FIG. 2.

The system interface unit 820 may process the processing request of the system API which is transmitted through the web server.

The system interface unit 820 may include a system interface request processing unit 821 that receives the system API processing request transmitted through the web server, and a system interface interworking unit 822 that maps the system API processing request transmitted from the system interface request processing unit as a platform dependent API, and processes the system API processing request by calling the mapped platform dependent API.

The system interface unit 820 may further include a system interface managing unit 823 that manages a system interface and a built-in web server.

Method for Executing Hybrid Web Application

Figure 9:
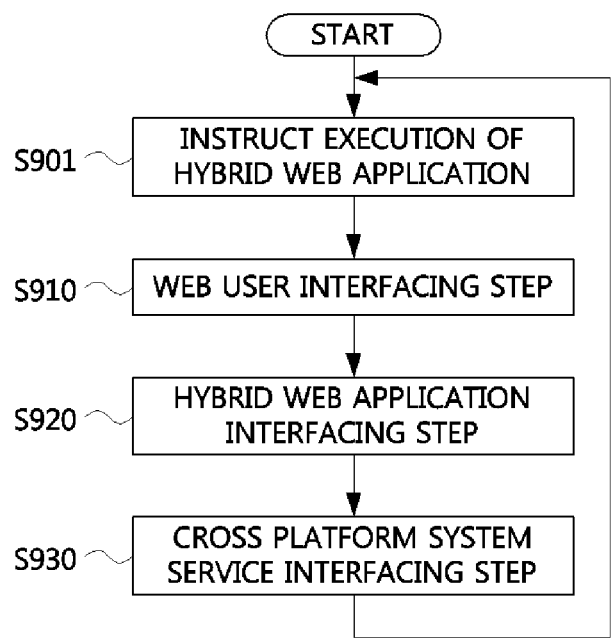
FIG. 9 is a flowchart illustrating a method for executing a hybrid web application according to an embodiment of the present invention.

FIG. 9 is a flowchart illustrating a method for executing a hybrid web application according to an embodiment of the present invention.

FIG. 9 will be referred to together with the software layer structure of FIG. 3 described above.

A method for executing a hybrid web application according to the present invention is a method for executing a hybrid web application in a device including the user interface layer 100, the hybrid web application interface layer 200, and the cross platform system service interface layer 300.

Referring to FIG. 9, the method for executing the hybrid web application according to the present invention includes a web user interfacing step S910, a hybrid web application interfacing step S920, and a cross platform system service interfacing step S930. These steps S910, S920, and S930 may be performed after a step S901 of receiving an execution instruction of the hybrid web application, and a process with respect to the web standard language constituting the hybrid web application and a process with respect to the system API call are performed in the programmed order, and continuously repeated.

First, the web user interfacing step S910, as an operation performed in the web user interface layer 100, includes interpreting a hybrid web application written in a web standard language including the system API call, requesting a process according to the system API call from the hybrid web application interface layer 200, and performing a process according to a portion excluding the system API call from the web standard language.

In order to perform the web user interfacing step S910, the web user interface layer 100 may include at least one web engine 120 for executing a general web standard language portion and a script engine 100 for separating the general web standard language portion and the system API call portion from the hybrid web application, as described above.

Next, the hybrid web application interfacing step S920, as an operation performed in the hybrid web application interface layer 200, includes requesting a process with respect to the system API call based on the request of the web user interface layer 100 from the cross platform system service interface layer 300, synchronously or asynchronously receiving a processing result with respect to the system API call from the cross platform system service interface layer 300, and transmitting the received processing result to the web user interface layer 100.

That is, in the hybrid web application interfacing step S920, a request for a process corresponding to the system API call is received from the web user interface layer 100, and a requested device control and a system function control API request is generated in accordance with a previously defined specification. Thereafter, the generated request may be transmitted to the cross platform system service interface layer 300 in accordance with synchronous/asynchronous interface processing methods.

In accordance with the interface processing method in which the request is adopted, the hybrid web application interface layer 200 may synchronously or asynchronously receive the processing result of the request from the cross platform system service interface layer 300.

Processing request transmission and processing result reception between the hybrid web application interface layer 200 and the cross platform system service interface layer 300 have been described through FIG. 6, and therefore the repeated descriptions will be omitted.

The cross platform system service interfacing step S930, as an operation performed in the cross platform system service interface layer 300, is a step of performing a platform dependent operation corresponding to the system API based on the request of the hybrid web application interface layer 200.

In this instance, the cross platform system service interface layer 300 and the hybrid web application interface layer 200 may exchange a processing request and processing result of the system API using HTTP. Accordingly, the cross platform system service interface layer 300 and the hybrid web application interface layer 200 which are positioned in mutually different platforms may exchange the processing request and processing result of the system API using HTTP. That is, the hybrid web application may call the cross platform system service interface layer 300 provided from various terminals connected through wired and wireless networks using HTTP. A concept of the interworking between the cross platform system service interface layer 300 and the hybrid web application interface layer 200 which are positioned in mutually different terminals has been described through FIG. 8.

In the cross platform system service interfacing step S930, the cross platform system service interface layer 300 may receive the system API processing request transmitted from the web application interface layer 200, map the received system API processing request as a platform dependent API, and process the system API processing request by calling the mapped platform dependent API.

According to the method and device for executing the hybrid web application according to the present invention, the hybrid web application may be utilized instead of the native application and web application in the related art.

The hybrid web application has the following advantages.

First, a developer may easily develop a platform independent hybrid web application based on a web standard language so as to provide the developed application to various terminals and platform environments, and a user may be provided with complex services utilizing various data on the Internet, an open API, a cloud, and the like in the form of a hybrid application.

Second, using the hybrid web application method, an application having the same performance and function as the native application based on the web technologies may be developed. In addition, mash-up applications linked to various Internet open APIs may be easily developed and used.

Third, like a native application, the hybrid web application may be sold and installed through app stores and the like.

Fourth, a developer may learn only the system APIs defined for the standard hybrid web application, using the web standard language and technology, without learning a language and function dependent on the platform, thereby easily developing applications utilizing various terminal resources and system resources.

Fifth, when the hybrid web application is popularized, it is possible to solve a complex problem occurring due to a difference between explosively increasing terminal hardware characteristics and the platform, and to expand development efficiency and convenience by abstracting and providing the various terminal control functions.

Sixth, the hybrid web application may exchange control information even between mutually different terminals and enable remote control using an embedded web server, whereby applications towards machine to machine (M2M), device to device (D2D), and the like may be possible.

While the example embodiments of the present invention and their advantages have been described in detail, it should be understood that various changes, substitutions and alterations may be made herein without departing from the scope of the invention.

What is claimed is:

1. A device running on a processor of the device for executing a hybrid web application written in a web standard language including a system application programming interface (API) call, the device comprising:
   a web user interface layer that requests a process according to the system API call from a hybrid web application interface layer, and performs a process according to the web standard language using the processor;
   a hybrid web application interface layer that requests the process corresponding to the system API call from a cross platform system service interface layer in response to the request of the web user interface layer, synchronously or asynchronously receives a result of the process corresponding to the system API call from the cross platform system service interface layer, and transmits the received result to the web user interface layer; and a cross platform system service interface layer that performs a platform dependent operation corresponding to the system API based on the request of the hybrid web application interface layer, wherein the hybrid web application is able to operate independently in various kinds of platforms, and wherein the web user interface layer, the hybrid web application interface layer, and the cross platform system service interface layer are distinct layers.

2. The device according to claim 1, wherein the system API is an API that controls hardware or an API that accesses information managed by an operating system (OS).

3. The device according to claim 1, wherein the web standard language includes at least one of JavaScript, HyperText Markup Language (HTML), and Cascading Style Sheet (CSS).

4. The device according to claim 1, wherein the web user interface layer includes
at least one web engine for performing the process according to the web standard language, and
a script engine that separates the system API call included in the hybrid web application and requests the process according to the system API call from the hybrid web application interface layer.

5. The device according to claim 1, wherein the hybrid web application interface layer includes
a system API processing unit that processes the system API in response to the request of the web user interface layer,
an interface service request generating unit that generates a request for system API execution in response to the system API processing unit, and transmits the generated request to an interface service request relaying unit,
the interface service request relaying unit that relays, to the cross platform system service interface layer, the request for system API execution received from the interface service request generating unit, and
an interface service synchronization managing unit that manages reception of a processing result of the request for system API execution transmitted to the cross platform system service interface layer through the interface service request relaying unit.

6. The device according to claim 5, wherein the request for system API execution of the interface service request relaying unit is synchronous or asynchronous, and the interface service synchronization managing unit manages the interface service request relaying unit so that the interface service request relaying unit receives the processing result of the request for system API execution in any one of a synchronous method and an asynchronous method.

7. The device according to claim 1, wherein the cross platform system service interface layer includes a web server that transmits and receives a processing request of the system API and a processing result of the system API using the hybrid web application interface layer and HyperText Transfer Protocol (HTTP).

8. The device according to claim 7, wherein the web server transmits and receives the processing request of the system API and processing result of the system API using the hybrid web application interface layer and HTTP which are installed in another terminal.

9. The device according to claim 8, wherein the cross platform system service interface layer further includes a system interface unit that processes the processing request of the system API transmitted through the web server.

10. The device according to claim 9, wherein the system interface unit includes a system interface request processing unit that receives the processing request of the system API transmitted through the web server, and
a system interface interworking unit that maps the processing request of the system API transmitted from the system interface request processing unit as a platform dependent API, and processes the processing request of the system API by calling to the mapped platform dependent API.

11. A method for executing a hybrid web application of a platform including a web user interface layer, a hybrid web application interface layer, and a cross platform system service interface layer, the method comprising:
interpreting, by the web user interface layer, the hybrid web application written in a web standard language including a system API call, requesting a process according to the system API call from the hybrid web application interface layer, and performing a process according to the web standard language;
requesting, by the hybrid web application interface layer, the process according to the system API call based on the request of the web user interface layer from the cross platform system service interface layer, synchronously or asynchronously receiving a processing result of the system API call from the cross platform system service interface layer, and transmitting the received processing result to the web user interface layer; and
performing, by the cross platform system service interface layer, a platform dependent operation corresponding to the system API based on the request of the hybrid web application interface layer,
wherein the hybrid web application is able to operate independently in various kinds of platforms, and
wherein the web user interface layer, the hybrid web application interface layer, and the cross platform system service interface layer are distinct layers.

12. The method according to claim 11, wherein the system API is an API that controls hardware or an API that accesses information managed by an OS.

13. The method according to claim 11, wherein the web standard language includes at least one of JavaScript, HTML, and CSS.

14. The method according to claim 11, wherein the interpreting of the hybrid web application includes performing the process according to the web standard language using at least one web engine and requesting the process according to the system API call from the hybrid web application interface layer.

15. The method according to claim 11, wherein the requesting of the process according to the system API call includes
generating a request for system API execution based on a processing request corresponding to the system API call from the web user interface layer,
transmitting the generated request for system API execution to the cross platform system service interface layer, and
receiving a processing result of the transmitted request for system API execution from the cross platform system service interface layer.

16. The method according to claim 15, wherein reception of the processing result of the request for system API execution with respect to the request for system API execution is performed using a synchronous interface method or an asynchronous interface method.

17. The method according to claim 11, where the cross platform system service interface layer and the hybrid web application interface layer transmit and receive a processing request of the system API and a processing result of the system API using HTTP.

18. The method according to claim 11, wherein the hybrid web application interface layer transmits and receives the processing request of the system API and the processing result of the system API using a cross platform system service interface layer and HTTP of another terminal.

19. The method according to claim 18, wherein the performing of the platform dependent operation includes
   mapping the processing request of the system API transmitted from the hybrid web application interface layer as a platform dependent API, and
   processing the processing request of the system API by calling to the mapped platform dependent API.

* * * * *